United States Patent Office 3,277,142
Patented Oct. 4, 1966

---

3,277,142
ARYLOXYETHYL AND ARYLTHIOETHYL ESTERS OF THIOCARBAMIC ACIDS
Richard O. Zerbe, Nitro, W. Va., and Anton G. Weiss, Basel, Switzerland, assignors to Monsanto Company, a corporation of Delaware
No Drawing. Filed Aug. 7, 1963, Ser. No. 300,698
10 Claims. (Cl. 260—455)

This application is a continuation-in-part of application Serial No. 844,177, filed October 5, 1959, now abandoned.

The present invention relates to new thiocarbamates and more particularly to aryloxyethyl and arylthioethyl esters of thiocarbamic acids.

The compounds of the present invention may be represented by the general formula

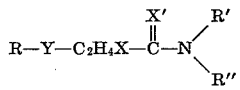

where R represents phenyl, halogen substituted phenyl, preferably containing at least one but not more than 3 chlorine atoms, or lower alkyl substituted phenyl, Y, X and X' represent oxygen or sulfur, Y being oxygen when both X and X' are sulfur, at least one of X and X' being sulfur, R' is lower alkyl or cyclohexyl, R'' is lower alkyl, as for example, methyl, ethyl, propyl, isopropyl, butyl, isobutyl and amyl, or R' and R'' together represent a single divalent hydrocarbon radical which forms with the nitrogen a heterocyclic radical, as for example 1-piperidinyl, 1-pyrrolidinyl, 5-ethyl-2-methyl-1-piperidinyl, and 1-hexamethyleneimino. Examples of R comprise phenyl, p-chlorophenyl, m-chlorophenyl, o-chlorophenyl, p-bromophenyl, 2,4-dichlorophenyl, 2,6-dichlorophenyl, 2-methyl-4-chlorophenyl, 2,4,5-trichlorophenyl, 2,4,6-trichlorophenyl, 2,3,6-trichlorophenyl, o-, m- and p-tolyl and p-ethylphenyl.

The products of the present invention possess useful biological activity. For example, some are effective for inhibiting the growth of microorganisms such as bacteria. The aryloxyethyl esters are, in general, particularly valuable as pre-emergent herbicides and are also somewhat toxic to foliage. Where the aryl radical is p-bromophenyl R' and R'' should be alkyl of three carbon atoms to support phytotoxicity. The arylthioethyl esters are valuable as insecticides and have low toxicity to plants.

The compounds may be prepared by several methods. The following examples illustrate the preparation but the invention is not limited thereto.

Example 1

To 17.2 grams (0.1 mole) of 2-(p-chlorophenoxy)-ethanol in 50 ml. of benzene and 20 ml. of triethylamine was added slowly with cooling 15.2 grams (0.1 mole) of N,N-diethylthiocarbamyl chloride. The stirred mixture was then heated at reflux over night, cooled and poured into 150 ml. of water and 250 ml. of ether. The ether-water solution was washed with water, dried over sodium sulfate and the solvent removed by stripping at 100° C./14 mm. The semi-solid so obtained was dried on a porous plate to give 2-(p-chlorophenoxy)ethyl diethylthionocarbamate as a white solid, M.P. 81–83° C. Analysis gave 4.9% nitrogen, 10.7% sulfur and 12.0% chlorine compared to 4.9% nitrogen, 11.1% sulfur and 12.3% chlorine calculated for $C_{13}H_{18}ClNO_2S$.

Example 2

In the procedure of Example 1, 43 grams (0.25 mole) of 2-(p-chlorophenoxy)ethanol, 150 ml. of benzene, 40 ml. of triethylamine and 45 grams (0.25 mole) of N,N-diisopropylthiocarbamyl chloride were employed. 2-(p-chlorophenoxy)ethyl diisopropylthionocarbamate was obtained in 57% yield as a white solid, M.P. 104–105° C. Analysis gave 4.5% nitrogen, 10.1% sulfur and 11.1% chlorine compared to 4.4% nitrogen, 10.2% sulfur and 11.2% chlorine calculated for $C_{15}H_{22}ClNO_2S$.

Properties of other products obtained in similar manner are recorded below:

2-(p-chlorophenoxy)ethyl dibutylthionocarbamate, an amber oil, in 95.3% yield. Analysis gave 4.0% nitrogen, 9.5% sulfur and 10.4% chlorine compared to 4.1% nitrogen, 9.3% sulfur and 10.3% chlorine calculated for $C_{17}H_{26}ClNO_2S$.

2-(p-chlorophenoxy)ethyl dimethylthionocarbamate, a white solid melting at 82–84° C., in 98.5% yield. Analysis gave 5.3% nitrogen, 15.4% sulfur and 13.1% chlorine compared to 5.4% nitrogen, 12.3% sulfur and 13.6% chlorine calculated for $C_{11}H_{14}ClNO_2S$.

2 - (2,4 - dichlorophenoxy)ethyl diisopropylthionocarbamate, a white solid melting at 97–100° C., in 59% yield. Analysis gave 4.0% nitrogen, 11.6% sulfur and 19.6% chlorine compared to 4.2% nitrogen, 9.5% sulfur and 21.2% chlorine calculated for $C_{15}H_{21}Cl_2NO_2S$.

2 - (2,4 - dichlorophenoxy)ethyl dimethylthionocarbamate, a pale yellow solid melting at 72–74° C., in 34% yield. Analysis gave 4.8% nitrogen, 13.8% sulfur and 23.5% chlorine compared to 4.8% nitrogen, 10.9% sulfur and 24.1% chlorine calculated for $$C_{11}H_{13}Cl_2NO_2S$$

2-(2,4-dichlorophenoxy)ethyl dibutylthionocarbamate, an amber oil, in 95.2% yield. Analysis gave 3.9% nitrogen, 8.6% sulfur and 18.5% chlorine compared to 3.7% nitrogen, 8.5% sulfur and 18.8% chlorine calculated for $C_{17}H_{25}Cl_2NO_2S$.

2 - (2,4,5 - trichlorophenoxy)ethyl diethylthionocarbamate, a white solid melting at 66–67° C. in 49.5% yield. Analysis gave 4.1% nitrogen, 8.4% sulfur and 27.0% chlorine compared to 3.9% nitrogen, 9.1% sulfur and 29.8% chlorine calculated for $C_{13}H_{16}Cl_3NO_2S$.

2 - (3,4,5 - trichlorophenoxy)ethyl diisopropylthionocarbamate, a white solid melting at 124–125° C., in 61.5% yield. Analysis gave 3.9% nitrogen, 8.7% sulfur and 25.5% chlorine compared to 3.6% nitrogen, 8.3% sulfur and 27.6% chlorine calculated for $C_{15}H_{20}Cl_3NO_2S$.

2 - (2,4,5 - trichlorophenoxy)ethyl dibutylthionocarbamate, an amber oil, in 99% yield. Analysis gave 3.5% nitrogen, 7.8% sulfur and 24.3% chlorine compared to 3.4% nitrogen, 7.8% sulfur and 25.8% chlorine calculated for $C_{17}H_{24}Cl_3NO_2S$.

2-(p-bromophenoxy)ethyl diisopropylthionocarbamate, a white solid melting at 115–117° C., in 59% yield. Analysis gave 4.0% nitrogen, 8.6% sulfur and 22.2% bromine compared to 3.9% nitrogen, 8.9% sulfur and 22.2% bromine calculated for $C_{15}H_{22}BrNO_2S$.

2-(p - bromophenoxy)ethyl diethylthionocarbamate, a pale yellow solid melting at 113–114° C., in 76% yield. Analysis gave 4.6% nitrogen, 9.5% sulfur and 23.7% bromine compared to 4.2% nitrogen, 9.7% sulfur and 24.1% bromine calculated for $C_{13}H_{18}BrNO_2S$.

2-(p-bromophenoxy)ethyl dipropylthionocarbamate, a white solid melting at 43–44° C., in 44.5% yield. Analysis gave 4.1% nitrogen, 8.4% sulfur and 22.1% bromine compared to 3.9% nitrogen, 8.9% sulfur and 22.2% bromine calculated for $C_{15}H_{22}BrNO_2S$.

2-(2,4-dichlorophenoxy)ethyl diethylthionocarbamate, a white solid melting at 70–72° C., in 50% yield. Analysis gave 4.4% nitrogen, 9.8% sulfur and 21.0% chlorine compared to 4.4% nitrogen, 9.9% sulfur and 22.0% chlorine calculated for $C_{13}H_{17}Cl_2NO_2S$.

2-(2,4,6-trichlorophenoxy)ethyl diethylthionocarbamate, an amber oil, in 81.5% yield. Analysis gave 3.4% nitrogen, 9.1% sulfur and 27.9% chlorine compared to 3.9% nitrogen, 9.0% sulfur and 29.8% chlorine calculated for $C_{13}H_{16}Cl_3NO_2S$.

2-(2,4,6-trichlorophenoxy)ethyl diisopropylthionocarbamate, an amber oil, in 66.5% yield. Analysis gave 3.8% nitrogen compared to 3.6% calculated for $C_{15}H_{20}Cl_3NO_2S$.

2-(phenylthio)ethyl diethylthionocarbamate, an amber oil, in 89.2% yield. Analysis gave 5.36% nitrogen and 24.21% sulfur compared to 5.20% nitrogen and 23.80% sulfur calculated for $C_{13}H_{19}NOS_2$.

2-(phenylthio)ethyl diisopropylthionocarbamate, a tan solid melting at 60–61° C., in 65.7% yield. Analysis gave 4.92% nitrogen and 21.77% sulfur compared to 4.71% nitrogen and 21.56% sulfur calculated for $C_{15}H_{23}NOS_2$.

2-(phenylthio)ethyl dipropylthionocarbamate, an amber oil, in 94.3% yield. Analysis gave 4.80% nitrogen and 21.00% sulfur compared to 4.71% nitrogen and 21.56% sulfur calculated for $C_{15}H_{23}NOS_2$.

2-(p-chlorophenylthio)ethyl diethylthionocarbamate, an amber oil, in 100% yield. Analysis gave 4.76% nitrogen and 12.36% chlorine compared to 4.61% nitrogen and 11.36% chlorine calculated for $C_{13}H_{18}ClNOS_2$.

2-(p-chlorophenylthio)ethyl diisopropylthionocarbamate, a pale yellow solid melting at 78–79° C. Analysis gave 4.22% nitrogen and 10.72% chlorine compared to 4.22% nitrogen and 10.68% chlorine calculated for $C_{15}H_{22}ClNOS_2$.

2-(p-chlorophenylthio)ethyl dibutylthionocarbamate, an amber oil, in 100% yield. Analysis gave 3.82% nitrogen, 17.95% sulfur and 10.78% chlorine compared to 3.89% nitrogen, 17.82% sulfur and 9.85% chlorine calculated for $C_{17}H_{26}ClNOS_2$.

*Example 3*

Into a reaction vessel was charged 30 grams (0.3 mole) of dipropylamine and 100 ml. of dimethyl formamide. To the solution so prepared 7.6 grams of carbon bisulfide were added gradually at 25–30° C. There was then added 19.1 grams of β,p-dichlorophenetole and the reaction mixture heated at 60–70° C. for 12 hours. It was then cooled, 250 ml. of ice water added and extracted with ethyl ether. The ether was removed in vacuo, (95–100° C./14 mm. Hg) to leave the desired p-chlorophenoxyethyl dipropyldithiocarbamate as the residue, an amber oil, in quantitative yield. It contained 4.6% nitrogen, 10.6% chlorine and 19.4% sulfur compared to 4.2% nitrogen, 10.7% chlorine and 19.3% sulfur calculated for $C_{15}H_{22}ClNOS_2$.

Properties of other typical products prepared in similar manner are recorded below:

2-(p-chlorophenoxy)ethyl diethyldithiocarbamate, an amber oil obtained in 100% yield containing 5.0% nitrogen, 11.3% chlorine and 21.8% sulfur compared to 4.6% nitrogen, 11.7% chlorine and 21.1% sulfur calculated for $C_{13}H_{18}ClNOS_2$.

2-(phenoxy)ethyl dipropyldithiocarbamate, an amber oil obtained in 100% yield containing 4.7% nitrogen and 21.6% sulfur compared to 4.7% nitrogen and 21.6% sulfur calculated for $C_{15}H_{23}NOS_2$.

2-(phenoxy)ethyl diethyldithiocarbamate, an amber oil obtained in 100% yield containing 5.3% nitrogen and 24.4% sulfur compared to 5.2% nitrogen and 23.8% sulfur calculated for $C_{13}H_{19}NOS_2$.

2-(phenoxy)ethyl diisopropyldithiocarbamate, a tan solid obtained in 100% yield. It melted at 62–63° C. after recrystallizing from ethanol. It contained 4.8% nitrogen and 21.6% sulfur compared to 4.7% nitrogen and 21.6% sulfur calculated for $C_{15}H_{23}NOS_2$.

*Example 4*

To a stirred solution containing 28.5 grams (0.4 mole) of pyrrolidine, 40 grams (0.25 mole) of 25% sodium hydroxide and 50 grams of water was added at 0–10° C., over a period of 30 minutes, 19.6 grams (0.28 mole) of 85% carbonoxysulfide. Thereupon there were added 200 ml. of dimethyl formamide followed by addition in one portion of 47.8 grams (0.25 mole) of p-chlorophenoxyethyl chloride. The stirred reaction mixture was held at 0–10° C. for one hour, at 10–15° C. the second hour, at 15–20° C. the third hour, at 20–25° C. the fourth hour and at 25–30° C. for 20 hours. After the 24 hour stirring period, 600 ml. of water were added and the mixture cooled to 0° C. The precipitate was collected by filtration, washed with water until neutral and air-dried at 25–30° C. 2-(p-chlorophenoxy)ethyl 1-pyrrolidinecarbothiolate was obtained as a white solid melting at 66–67° C. after recrystallization from heptane. Analysis gave 4.23% nitrogen, 11.69% sulfur and 12.73% chlorine compared to 4.90% nitrogen, 11.22% sulfur and 12.41% chlorine calculated for $C_{13}H_{16}ClNO_2S$.

The product of Example 4 is a valuable herbicide. For this purpose it is preferred that one of X and X' in the general formula is oxygen. Further examples of the new herbicides are 2-(p-chlorophenoxy)ethyl 4-morpholinecarbothiolate,
2-(p-chlorophenoxy)ethyl N-cyclohexyl-N-ethylthiolcarbamate,
2-(p-chlorophenoxy)ethyl N-ethyl-N-phenylthiolcarbamate,
2-(2,4-dichlorophenoxy)ethyl hexamethyleneiminecarbothiolate,
2-(p-chlorophenoxy)ethyl dipropylthiolcarbamate,
2-(p-chlorophenoxy)ethyl diethylthiolcarbamate,
2-(2,4-dichlorophenoxyethyl) N-cyclohexyl-N-ethylthionocarbamate,
2-(2,4-dichlorophenoxyethyl) N-ethyl-N-phenylthionocarbamate,
2-(2,4-dichlorophenoxyethyl) 1-piperidinecarbothionate,
2-(2,4-dichlorophenoxyethyl) 5-ethyl-2-methyl-1-piperidinecarbothionate,
2-(p-tolyloxyethyl) 1-pyrrolidinecarbothiolate,
2-(p-ethylphenoxyethyl) 1-pyrrolidinecarbothiolate and
2-(p-chlorophenoxyethyl) N-cyclohexyl N-methylthiolcarbamate.

As indicated above, many of the new compounds herein are useful as agricultural chemicals. They may be applied in toxic quantities in any suitable fashion, either as sprays or dusts. When employed as dusts, they may be compounded with inert carriers and diluents as desired, e.g. talc, clay, pyrophyllite, silica and fuller's earth. Alternatively, the dry composition may be dispersed in water and applied as a spray.

Pre-emergent herbicidal activity of typical compounds was demonstrated by emulsifying the ester in water and applying the emulsion as a spray. In this manner, the active ingredient at a dosage of 25 pounds per acre was applied to the ground of seeded plots before the grass or other plants emerged. About fourteen days after application of the toxicants results were observed and recorded. The number of seeds emerging was converted to weighted herbicidal ratings based on average percent germination of any particular seed lot times an injury factor. This evens irregularities of ratings on seeds which may vary in percent germination. The injury factor takes into consideration any plants not expected to survive. Thus, phytotoxicity ratings are based on the number of plants which emerge and will survive as observed two weeks after planting. Herbicidal ratings were assigned by means of the following conversion scale:

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

| Active Ingredient | Results Observed |
|---|---|
| 2-(p-chlorophenoxy)ethyl diethylthionocarbamate. | Severe phytotoxicity to pigweed, moderate to crab grass and radish-mustard. |
| 2-(p-chlorophenoxy)ethyl diisopropylthionocarbamate. | Severe phytotoxicity to morning glory, radish-mustard, sugar beet, crab grass and pigweed; moderate phytotoxicity to tomato and sorghum. |
| 2-(p-chlorophenoxy)ethyl dibutylthionocarbamate. | Severe phytotoxicity to crab grass and pigweed; moderate phytotoxicity to radish-mustard and sorghum. |
| 2-(p-chlorophenoxy)ethyl dimethylthionocarbamate | Severe phytotoxicity to morning glory, radish-mustard, pigweed and sorghum; moderate phytotoxicity to crab grass, wild buckwheat and tomato. |
| 2-(2,4-dichlorophenoxy)ethyl diisopropylthionocarbamate. | Severe phytotoxicity to morning glory, radish-mustard, sugar beet, pigweed, wild buckwheat and sorghum; moderate phytotoxicity to crab grass and tomato. |
| 2-(2,4-dichlorophenoxy)ethyl dimethylthionocarbamate. | Severe phytotoxicity to morning glory, radish-mustard, sugar beet, pigweed, tomato and sorghum; moderate phytotoxicity to rye grass, crab grass and wild buckwheat. |
| 2-(2,4-dichlorophenoxy)ethyl diethylthionocarbamate. | Severe phytotoxicity to morning glory, sugar beet, crab grass, pigweed and wild buckwheat; moderate phytotoxicity to brome grass and foxtail. |
| 2-(2,4-dichlorophenoxy)ethyl dibutylthionocarbamate. | Severe phytotoxicity to morning glory, radish-mustard, sugar beet, crab grass, pigweed, wild buckwheat, tomato and sorghum; moderate phytotoxicity to barnyard grass. |
| 2-(2,4,5-trichlorophenoxy)ethyl diethylthionocarbamate. | Do. |
| 2-(2,4,5-trichlorophenoxy)ethyl diisopropylthionocarbamate. | Severe phytotoxicity to morning glory; moderate phytotoxicity to tomato. |
| 2-(2,4,5-trichlorophenoxy)ethyl dibutylthionocarbamate. | Severe phytotoxicity to morning glory, wild oats, radish-mustard, sugar beet, barnyard grass, crab grass, pigweed, wild buckwheat, tomato and sorghum; moderate phytotoxicity to rye grass. |
| 2-(p-bromophenoxy)ethyl diisopropylthionocarbamate. | Severe phytotoxicity to morning glory, sugar beet and tomato; moderate phytotoxicity to radish-mustard. |
| 2-(p-bromophenoxy)ethyl dipropylthionocarbamate. | Severe phytotoxicity to pigweed. |
| 2-(2,4,6-trichlorophenoxy)ethyl diethylthionocarbamate. | Severe phytotoxicity to wild oats, rye grass, pigweed and sorghum; moderate phytotoxicity to crab grass. |
| 2-(2,4,6-trichlorophenoxy)ethyl diisopropylthionocarbamate. | Severe phytotoxicity to wild oats, rye grass, crab grass, pigweed and sorghum. |
| 2-(phenoxy)ethyl dipropyldithiocarbamate. | Severe phytotoxicity to wild oat and crab grass; moderate phytotoxicity to brome grass, rye grass, foxtail and wild buckwheat. |
| 2-(phenoxy)ethyl diethyldithiocarbamate. | Severe phytotoxicity to wild oat, rye grass, foxtail and crab grass; moderate phytotoxicity to pigweed. Chlorosis of grasses. |
| 2-(phenoxy)ethyl diisopropyldithiocarbamate. | Severe phytotoxicity to wild buckwheat; moderate phytotoxicity to foxtail and crab grass. |

An aqueous spray containing 0.5% of 2-(p-chlorophenoxy)ethyl dibutylthionocarbamate was applied to the foliage of grass and to the foliage of bean and broadleaf plants. Severe phytotoxicity to bean plants and moderate phytotoxicity to broadleaf species in general was observed. At the same concentration moderate phytotoxicity to broadleaf species was also observed with 2 - (p - chlorophenoxy)ethyl dipropyldithiocarbamate. Formative action and chlorosis of broadleaf plants were observed with an aqueous spray containing 0.5% of 2-(p-chlorophenoxy)ethyl diethyldithiocarbamate. It was still moderately toxic to broadleaf plants at a solution concentration of 0.05%. One of the alkyl radicals may be replaced by cyclohexyl or phenyl and phytotoxicity retained. 2-(p-chlorophenoxy)ethyl pyrrolidinecarbothiolate exerted formative action on all broadleaf pants in concentrations down to 0.05% when applied as a contact spray. When incorporated into the top soil at five pounds per acre it was severely toxic to grass seedlings. The only grass species not controlled was corn which was not injured. There was severe phytotoxicity on sugar beet, pigweed and soybean and moderate activity on morning glory, radish and tomato. This compound is valuable for selective grass and broadleaf weed control in corn and sugar cane.

The insecticidal effectiveness of the arylthioethyl esters was demonstrated against yellow fever mosquito larvae. Concentrations of 0.001% of the active ingredient resulted in 100% kill using any of the following: 2-(phenylthio)ethyl diethylthionocarbamate, 2 - (p - chlorophenylthio)ethyl diethylthionocarbamate, 2 - (p - chlorophenylthio)ethyl diisopropylthionocarbamate and 2 - (p - chlorophenylthio)ethyl dibutylthionocarbamate. A kill of 90% was achieved using a concentration of 0.001% of 2-(phenylthio)ethyl diisopropylthionocarbamate.

For evaluation of the bacteriostatic effects of these new compounds, the active ingredient was mixed in a predetermined concentration with hot sterile agar which was subsequently poured into a Petri dish, cooled, and allowed to harden. Nutrient agar containing the test material was then inoculated with the bacteria *Staphylococcus aureus* and incubated for two days at 37° C. Complete inhibition of growth at a concentration of 0.01% was achieved using 2-(2,4,6-trichlorophenoxy)ethyl diethylthionocarbamate. Complete inhibition at a concentration of 0.1% was obtained with 2-(2,4-dichlorophenoxy)ethyl dimethylthionocarbamate,
2-(phenylthio)ethyl diethylthionocarbamate,
2-(2,4,5-trichlorophenoxy)ethyl diethylthionocarbamate,
2-(2,4,5-trichlorophenoxy)ethyl dibutylthionocarbamate,
2-(p-chlorophenylthio)ethyl diethylthionocarbamate and
2-(2,4,6-trichlorophenoxy)ethyl diisopropylthionocarbamate.

2-(phenylthio)ethyl dipropylthionocarbamate and 2-(p-bromophenoxy)ethyl diethylthionocarbamate are toxic to *Venturia inaequalis*, causative organism of apple scab. These compounds destroyed the organism when applied thereto at a concentration of 10 parts per million.

By application to vegetation is meant either applying to the soil before the plants to be destroyed emerge whereby the toxicant is brought into contact with germinating seedlings or applying to foliage. Usually the active ingredient will be applied in a concentration within the range of 0.01–10.0%. For pre-emergence control of vegetation the total amount will usually fall within the range of 1–100 pounds per acre. Insects and microbiological pests are controlled by applying the toxic ingredients to their respective habitats. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents.

It is intended to cover all changes and modifications of the examples of the invention herein chosen for purposes of disclosure which do not constitute departures from the spirit and scope of the invention.

What is claimed is:
1. A compound of the structure

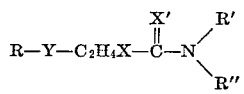

where R is selected from a group consisting of monochlorophenyl, dichlorophenyl, trichlorophenyl, p-bromophenyl, phenyl, tolyl, and p-ethylphenyl; R' is selected from the group consisting of cyclohexyl, phenyl, and lower alkyl; R" is lower alkyl; and together R' and R" with the nitrogen form a heterocyclic radical selected from the group consisting of 1-pyrrolidinyl, 1-piperidinyl, 5-ethyl-2-methyl-1-piperidinyl, 4-morpholinyl, and 1-hexamethylenimino; X, X', and Y being selected from a group consisting of oxygen and sulfur, one of X and X' being sulfur and the other oxygen.

2. A compound of the structure

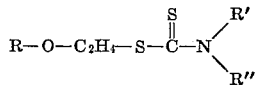

where R is selected from the group consisting of phenyl, monochlorophenyl, dichlorophenyl, trichlorophenyl, and p-bromophenyl; R' is selected from a group consisting of cyclohexyl, phenyl, and lower alkyl; R" is lower alkyl; and together R' and R" with the nitrogen form a heterocyclic radical selected from the group consisting of 1-pyrrolidinyl, 1-piperidinyl, 5-ethyl-2-methyl-1-piperidinyl, 4-morpholinyl, and 1-hexamethylenimino.

3. A compound of the structure

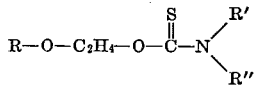

where R represents chlorine substituted phenyl containing at least one but not more than three chlorine atoms and R' and R" represent lower alkyl groups.

4. A compound of the structure

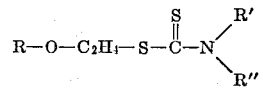

where R represents chlorine substituted phenyl containing at least one but not more than three chlorine atoms and R' and R" represent lower alkyl groups.

5. A compound of the structure

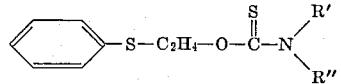

where R' and R" represent lower alkyl groups.

6. 2-(p-chlorophenoxy)ethyl diisopropylthionocarbamate.
7. 2-(2,4-dichlorophenoxy)ethyl dimethylthionocarbamate.
8. 2-(2,4,5-trichlorophenoxy)ethyl dibutylthionocarbamate.
9. 2-(p-chlorophenylthio)ethyl diethylthionocarbamate.
10. 2-(p-chlorophenoxy)ethyl 1-pyrrolidinecarbothiolate.

References Cited by the Examiner
UNITED STATES PATENTS

| | | | |
|---|---|---|---|
| 2,756,249 | 7/1956 | Kirshenbaum et al. | 260—455 |
| 2,992,091 | 7/1961 | Harman et al. | 71—2.6 |

CHARLES B. PARKER, *Primary Examiner.*

DALE R. MAHANAND, *Assistant Examiner.*